(12) United States Patent
Reuschel et al.

(10) Patent No.: US 9,340,110 B2
(45) Date of Patent: May 17, 2016

(54) LIGHTING DEVICE OF CLOSED CONFIGURATION FOR A MOTOR VEHICLE

(75) Inventors: Jens Dietmar Reuschel, Ingolstadt (DE); Christoph Schmitz, Abensberg (DE)

(73) Assignee: AUDI AG, Ingolstadt (DE)

( * ) Notice: Subject to any disclaimer, the term of this patent is extended or adjusted under 35 U.S.C. 154(b) by 835 days.

(21) Appl. No.: 13/438,390

(22) Filed: Apr. 3, 2012

(65) Prior Publication Data

US 2012/0250342 A1 Oct. 4, 2012

(30) Foreign Application Priority Data

Apr. 4, 2011 (DE) .......................... 10 2011 016 002

(51) Int. Cl.
*B60Q 3/02* (2006.01)
*F21V 8/00* (2006.01)
*B60K 37/00* (2006.01)
*B60Q 3/00* (2006.01)

(52) U.S. Cl.
CPC ................ *B60K 37/00* (2013.01); *B60Q 3/004* (2013.01); *B60Q 3/024* (2013.01)

(58) Field of Classification Search
USPC .......................................... 362/488, 511, 257
See application file for complete search history.

(56) References Cited

U.S. PATENT DOCUMENTS

2003/0006230 A1    1/2003   Kaji et al.

FOREIGN PATENT DOCUMENTS

| CN | 1395059 A | 2/2003 |
|---|---|---|
| DE | 10153543 | 5/2003 |
| DE | 102004047653 | 5/2005 |
| DE | 60031397 | 8/2007 |
| DE | 202009011238 | 5/2010 |
| WO | WO2008/029347 A2 | 3/2008 |
| WO | WO2010/061318 | 6/2010 |

*Primary Examiner* — Anne Hines
*Assistant Examiner* — Brenitra M Lee
(74) *Attorney, Agent, or Firm* — Henry M. Feiereisen LLC.

(57) ABSTRACT

A lighting device of a motor vehicle includes a light guide having a closed configuration at least as seen from a top view. The light guide includes two sections which cross each other at a crossover. A first light source is linked to one end of the light guide to project light into the light guide. Arranged at the crossover is an adapter for adjusting a light intensity, measurable in a direction in opposition to the top view, to a light intensity of another section of the light guide in a region of the crossover.

28 Claims, 1 Drawing Sheet

LIGHTING DEVICE OF CLOSED CONFIGURATION FOR A MOTOR VEHICLE

CROSS-REFERENCES TO RELATED APPLICATIONS

This application claims the priority of German Patent Application, Serial No. 10 2011 016 002.7, filed Apr. 4, 2011, pursuant to 35 U.S.C. 119(a)-(d), the content of which is incorporated herein by reference in its entirety as if fully set forth herein.

BACKGROUND OF THE INVENTION

The present invention relates to a lighting device for a motor vehicle, a motor vehicle equipped with such a lighting device, and to an assist system for a motor vehicle, equipped with such a lighting device.

The following discussion of related art is provided to assist the reader in understanding the advantages of the invention, and is not to be construed as an admission that this related art is prior art to this invention.

Motor vehicles typically have several lights or lighting devices for illuminating the interior space. Predominantly, this involves lamps that can be switched on or off. Normally, these lamps are not intended to convey additional information that could be visually perceived by the vehicle occupant. Moreover, current vehicles are equipped with numerous assist systems to support the driver during maneuvering the vehicle, e.g. lane assistant, warning indication to the driver of a passing vehicle, ranging system, etc., and to alert also passengers, e.g. warning about an approaching cyclist, when opening the door. These assist systems predominantly trigger visual alerts and warnings. Thus, these visual alerts and warnings should be located at sites within the viewing range of the occupants.

Light guides are normally installed in a vehicle linearly, optionally also with a curvature. When illumination of round objects is involved, e.g. steering wheel, the provision of a closed configuration (e.g. closed circle) of the light guide is desired. As light guides are oftentimes made of fibers, with a light source arranged on one end of the light guide for projecting light, only "quasi-closed" configurations can be realized which are perceived closed in one viewing direction, e.g. perpendicular to the steering wheel. In fact, two sections of the light guide are arranged on top of one another at a crossover so that the light guide construction seems brighter in the area of the crossover as virtually two light guide sections, each emitting light, are arranged behind one another or in close side-by-side relationship. This inhomogeneity causes an inferior impression.

It is also possible to bend the light guide sections in the area of the crossover to such an extent that the crossover is positioned behind a faceplate. This is disadvantageous because of the presence of a dark spot in the area of the crossover as the light guide is bent away from the visible range in the area of the crossover, thereby also causing an inhomogeneity which is not desired.

It would therefore be desirable and advantageous to provide an improved lighting device to obviate prior art shortcomings.

SUMMARY OF THE INVENTION

According to one aspect of the present invention, a lighting device of a motor vehicle includes a light guide having a closed configuration at least as seen from a top view, with the light guide including two sections which cross each other at a crossover, a first light source linked to one end of the light guide to project light into the light guide, and an adapter arranged at the crossover for adjusting a light intensity, measurable in a direction in opposition to the top view, to a light intensity of another section of the light guide in a region of the crossover.

In accordance with the present invention, the presence of an adapter in the area of the crossover of the light guide adjusts the light intensity to the light intensity of another section, e.g. a neighboring section, of the light guide. As a result, the closed configuration of the light guide provides in its entirety a homogenous light impression, i.e. a homogenous light distribution.

According to another advantageous feature of the present invention, the closed configuration may be realized by a circular ring. This involves in general the shape of a typical steering wheel. Of course, other closed configurations are conceivable as well, e.g. rounded polygonals, in the shape of the numeral eight, etc., in order to realize fiber-shaped light guides with homogenous light emission.

According to another advantageous feature of the present invention, the light guide can be made of an elongated material which is bent into the closed configuration as seen from the top view. An example of such a light guide includes a optical fiber with round or polygonal cross section. There is thus no need to manufacture for each desired shape a separate plastic part. Rather, the desired shapes can be realized through bending.

According to another advantageous feature of the present invention, a second light source can be arranged on another end of the light guide to project light into the light guide. This is beneficial because in order to achieve the desired light emission, the light guide is made of partly transparent material (significantly reduced transmission), which means that the light intensity decreases inside the light guide with the distance from the light source. The presence of two light sources to project light from both sides of the light guide is therefore of advantage, in particular when the light guide exceeds a certain length. The light intensities can then additively superimpose inside the light guide.

According to another advantageous feature of the present invention, the light source on one or both sides of the light guide may be configured as LED. The provision of an LED generates intense light while being energy-efficient. Optionally, multicolored LEDs may be used to generate for example white light for simple illumination and red light for alerts.

According to another advantageous feature of the present invention, the adapter can cover a lower one of the two sections of the light guide, as seen from a top view, at the crossover. As a result, the lower section of the light guide is prevented from contributing any light, as seen from a top view, in the area of the crossover. Suitably, the adapter is implemented in the form of a film. Such a film is easy to place between the crossing sections of the light guide. Currently preferred is the use of a black film so that the film does not illuminate even when light is projected from the upper section of the light guide. The black film thus does not produce any light in the area of the crossover. In this way, the light impression is homogenous over the entire closed configuration.

According to another advantageous feature of the present invention, the adapter may be partly transparent to connect two further sections of the light guide with one another in proximity of the crossover. This type of adapter, when bearing upon the two sections of the light guide, establishes in fact a closed configuration. Light is hereby extracted from the light guide sections into the partly transparent adapter. As it is partly transparent, the adapter illuminates accordingly. When the geometry is beneficial and the partial transparency is appropriate, the closed configuration again produces a homogenous light impression.

A lighting device according to the present invention can be used to equip a steering wheel or to be integrated in an assist system for a motor vehicle for triggering a visual alert and in particular a warning signal for the driver and/or a vehicle occupant. Thus, the steering wheel may also be used for example as visual alerts.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
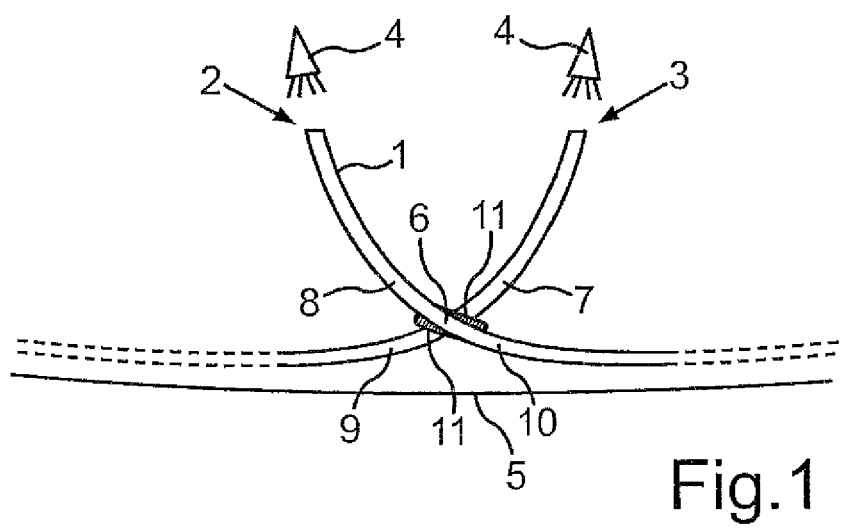
FIG. 1 is a schematic illustration of a first embodiment of a lighting device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of a lighting device according to the present invention in closed configuration, e.g. a closed circular ring. The lighting device can be installed in a motor vehicle, e.g. on a steering wheel and includes a light guide 1 made for example from optical fibers of a thickness of few millimeters. The material of the optical fibers is partly transparent so as to illuminate when light is projected into an end face thereof.

As shown by way of example in FIG. 1, the light guide 1 in the form of a partly transparent fiber has a first end 2 and a second end 3. Light sources 4 respectively arranged at the end faces of both ends 2, 3 project light into the light guide 1. The light sources 4 may involve LEDs for example. It is, of course, also conceivable to use different types of lighting devices such as, for example, incandescent bulbs. Also useable are monochromatic or polychromatic light sources.

The light sources 4 are controlled by a control unit, not shown in the drawings, to be able to switch on or off the light sources or to dim light. When polychromatic light sources are involved, the control unit operates the desired individual light sources to produce the desired color.

As indicated in FIG. 1, the light guide 1 is installed in a steering wheel 5 and is fully wrapped around the steering wheel 5. FIG. 1 shows however, on an enlarged scale only an area of a crossover 6 in which the light guide 1 crosses. As seen from a top view, the light guide 1 has a lower first section 7 and an upper second section 8 arranged above the first section 7. In fiber length direction, the light guide 1 has a third section 9 immediately adjacent to the first section 7 in proximity of the crossover 6. Likewise, a fourth section 10 of the light guide 1 is arranged in fiber length direction immediately adjacent to the second section 8 in proximity of the crossover 6. The entire light guide 1 thus includes from the first end 2 to the second end 3 the following sections: an undesignated section from the first end 2 to the second section 8 in the area of the crossover 6, the immediately adjacent fourth section 10, a section indicated only by dashed line in FIG. 1 to wrap around the steering wheel 5, the adjacent third section 9 just shy of the area of the crossover 6, the immediately adjacent lower first section 7, and an undesignated continuing section leading to the second end 3.

As the first and second sections 7, 8 lie above one another in the area of the crossover 6, as seen from a top view, the light intensity would be amplified in this area compared to the other sections of the light guide 1 and thus produce a different light impression. For sake of simplicity, the term "light intensity" is used in the description in a generic sense, even though light density in relation to a length unit is, in fact, involved.

In order to prevent the increase in light intensity in the area of the crossover 6, a black film 11 is placed between the first section 7 and the second section 8 of the light guide 1. For sake of clarity, the film 11 is shown in FIG. 1 on a slightly enlarged scale. The film 11 is in fact sized to lie substantially completely behind the upper second section 8 of the light guide 1 in the area of the crossover 6, when viewed from above. This ensures that only the upper second section 8 contributes in top view in the area of the crossover 6 to the light impression, whereas the lower first section 7 is shaded. As a result, a homogenous light impression is established in the area of the crossover 6, i.e. each visible section of the light guide 1 emits a same amount of light (constant brightness and homogenous light distribution).

Figure 2:
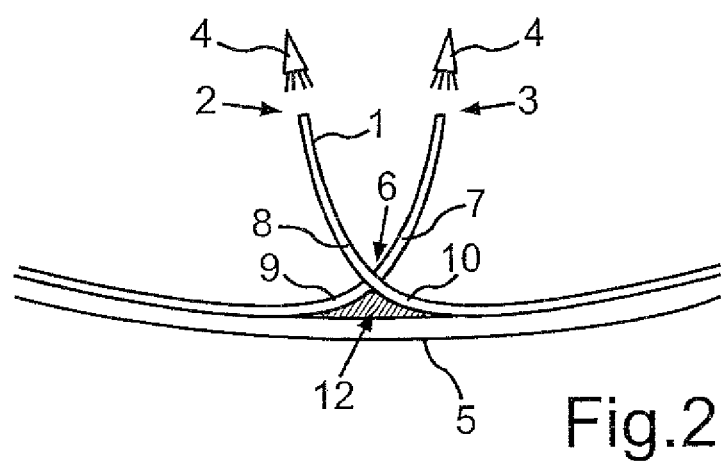
FIG. 2 is a schematic illustration of a second embodiment of a lighting device according to the present invention.

Referring now to FIG. 2, there is shown a schematic illustration of a second embodiment of a lighting device according to the present invention. Parts corresponding with those in FIG. 1 are denoted by identical reference numerals and not explained again. The description below will center on the differences between the embodiments. In this embodiment, the light guide 1 is integrated in the steering wheel 5 in such a way that the area of the crossover 6 is invisible. For that purpose, the sections 9, 10 are severely bent just shy or just after the area of the crossover 6, respectively. In order to prevent the region between the sections 9, 10 from appearing dark, a partly transparent adapter 12 is attached to the sections 9, 10 of the light guide 1. These two sections 9, 10 project light into the partly transparent adapter 12. As a result, the adapter 12 illuminates in a same way as the other sections of the light guide 1, when the light sources 4 are switched on. The partly transparent adapter 12, which can be made, for example, from PMMA (polymethyl methacrylate), directly connects the sections 9, 10 and continues to form the closed configuration in the area of the crossover 6. As a result, a closed illuminating configuration is established. Homogeneity in the area of the crossover 6 is realized in particular by selecting the geometry of the partly transparent adapter 12 in the area of the sections 9, 10 in such a way that light is appropriately extracted from the light guide 1 into the adapter 12. Furthermore, transparency and transmission of the adapter 12 is respectively adjusted.

In sum, the extracted light quantities result in a homogenous halo. The part transparency can be adjusted by polishing or roughening the surface of the adapter 12. The greater the amount of light to be extracted by the adapter 12 to the outside, the less the surface of the adapter 12 is polished.

The homogenous halo can be used for example to illuminate the steering wheel white. In the event, the driver should be warned of an imminent danger, the steering wheel can be illuminated all around in a homogenous red hue. The homogenous light impression can thus also be used as warning function.

The warning function can generally be realized by having the control unit check a signal. When the signal meets a predefined condition, the control unit controls the operation of a lighting device assigned for that condition. The lighting device has the structure as described above.

Warning functions are useful in particular for driver assist systems. The afore-described lighting device may, for example, be used for a ranging system which constantly checks whether a certain distance is maintained to a vehicle ahead. The control can hereby be realized for example by using radar. When the distance falls below a predefined minimum distance, the driver is suitably alerted, using the afore-described lighting device placed for example below the windshield, or on the dashboard, or the like.

A lighting device according to the present invention may also be used for a driver assist system in the form of a warning indication to the driver of a passing vehicle. In this case, the warning system includes a radar beam for example to scan the rearward area of a motor vehicle. When determining the presence of a passing vehicle and the own vehicle signals a move to the lane of the passing vehicle or a steering angle of the own vehicle is registered in a direction of the lane of the passing vehicle, a visual alert is triggered. This visual alert may involve, for example, a moving light generated along the inner side of the door at the side of the passing vehicle to indicate a passing maneuver by another vehicle. The moving light may be red for example and moves forwardly in travel direction.

A further application of the lighting device according to the present invention as part of an assist system may involve a "disembarking assistant". For example, when the vehicle stops next to a bicycle lane and an occupant wishes to disembark, a respective illumination at the door indicates whether or not it is safe to open the door. If there is no danger, this state can be indicated by green light on the inside of the door for example, whereas a potential danger as a result of an approaching or passing cyclist can be indicated by a red light.

Of course, other driver assist systems may be equipped with a lighting device according to the present invention. The lighting device may hereby be configured very large because it represents a high-quality decorative element when not in use.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A lighting device of a motor vehicle, comprising:
   a light guide having a closed configuration at least as seen from a top view, said light guide including two sections which cross each other at an crossover;
   a first light source linked to one end of the light guide to project light into the light guide; and
   an adapter arranged at the crossover for adjusting a light intensity, measurable in a direction in opposition to the top view, to a light intensity of another section of the light guide in a region of the crossover so as to maintain a homogenous light intensity throughout the light guide.

2. The lighting device of claim 1, wherein the closed configuration is a circular ring.

3. The lighting device of claim 1, wherein the light guide is made of an elongated material which is bent into the closed configuration as seen from a top view.

4. The lighting device of claim 1, further comprising a second light source arranged on another end of the light guide to project light into the light guide.

5. The lighting device of claim 1, wherein at least one of the first and second light sources is constructed as an LED.

6. The lighting device of claim 1, wherein the adapter covers a lower one of the two sections of the light guide, as seen from a top view, at the crossover to prevent escape of light from the lower one of the two sections.

7. The lighting device of claim 6, wherein the adapter is a film.

8. The lighting device of claim 7, wherein the film is a black film.

9. The lighting device of claim 1, wherein the adapter is partly transparent to connect two further sections of the light guide with one another in proximity of the crossover.

10. A steering wheel for a motor vehicle, comprising a lighting device which includes a light guide having a closed configuration at least as seen from a top view, said light guide including two sections which cross each other at an crossover, a first light source linked to one end of the light guide to project light into the light guide, and an adapter arranged at the crossover for adjusting a light intensity, measurable in a direction in opposition to the top view, to a light intensity of another section of the light guide in a region of the crossover so as to maintain a homogenous light intensity throughout the light guide.

11. The steering wheel of claim 10, wherein the closed configuration is a circular ring.

12. The steering wheel of claim 10, wherein the light guide is made of an elongated material which is bent into the closed configuration as seen from the top view.

13. The steering wheel of claim 10, further comprising a second light source arranged on another end of the light guide to project light into the light guide.

14. The steering wheel of claim 10, wherein at least one of the first and second light sources is constructed as an LED.

15. The steering wheel of claim 10, wherein the adapter covers a lower one of the two sections of the light guide as seen from the top view at the crossover to prevent escape of light from the lower one of the two sections.

16. The steering wheel of claim 14, wherein the adapter is a film.

17. The steering wheel of claim 16, wherein the film is a black film.

18. The steering wheel of claim 10, wherein the adapter is partly transparent to connect two further sections of the light guide with one another in proximity of the crossover.

19. An assist system, comprising a lighting device for generating an optical indication, said lighting device including a light guide having a closed configuration at least as seen from a top view, said light guide including two sections which cross each other at an crossover, a first light source linked to one end of the light guide to project light into the light guide, and an adapter arranged at the crossover for adjusting a light intensity, measurable in a direction in opposition to the top view, to a light intensity of another section of the light guide in a region of the crossover so as to maintain a homogenous light intensity throughout the light guide.

20. The assist system of claim 19, wherein the lighting device is configured for generating an optical warning.

21. The assist system of claim 19, wherein the closed configuration is a circular ring.

22. The assist system of claim 19, wherein the light guide is made of an elongated material which is bent into the closed configuration as seen from the top view.

23. The assist system of claim 19, further comprising a second light source arranged on another end of the light guide to project light into the light guide.

24. The assist system of claim 23, wherein at least one of the first and second light sources is constructed as an LED.

25. The assist system of claim 19, wherein the adapter covers a lower one of the two sections of the light guide as seen from the top view at the crossover to prevent escape of light from the lower one of the two sections.

26. The assist system of claim 23, wherein the adapter is a film.

27. The assist system of claim 26, wherein the film is a black film.

28. The assist system of claim 19, wherein the adapter is partly transparent to connect two further sections of the light guide with one another in proximity of the crossover.

* * * * *